United States Patent [19]

Woythal

[11] 4,186,892
[45] Feb. 5, 1980

[54] NON-SEIZING CLOSED LOOP FILM TRANSPORT SYSTEM

[75] Inventor: Gerald C. Woythal, Greenfield, Wis.

[73] Assignee: Borg-Textile Corporation, Oak Brook, Ill.

[21] Appl. No.: 915,167

[22] Filed: Jun. 15, 1978

Related U.S. Application Data

[63] Continuation-in-part of Ser. No. 817,565, Jul. 21, 1977, abandoned.

[51] Int. Cl.² ............................................. G11B 23/06
[52] U.S. Cl. ................................ 242/55.19 R; 352/128
[58] Field of Search ................ 242/55.19 R, 55.19 A, 242/55.18; 352/128, 126

[56] References Cited

U.S. PATENT DOCUMENTS

| 1,887,664 | 11/1932 | Stechbart | 352/128 X |
| 2,042,599 | 6/1936 | Heinis | 242/55.19 R |
| 2,311,383 | 2/1943 | Hardenberg | 352/128 X |
| 2,873,847 | 2/1959 | Holland, Jr. | 198/494 |
| 3,235,195 | 2/1966 | Hebb et al. | 242/55.19 A |
| 3,365,140 | 1/1968 | Post | 242/55.19 R |
| 3,677,628 | 7/1972 | Walker | 352/128 |
| 3,722,809 | 3/1973 | Leisring | 242/55.19 R |
| 4,054,925 | 10/1977 | Towner et al. | 242/55.19 R |

Primary Examiner—Billy S. Taylor
Attorney, Agent, or Firm—Hill, Van Santen, Steadman, Chiara & Simpson

[57] ABSTRACT

A film transport system for transporting a closed loop of film continuously about a defined pathway incorporating a sub-pathway whereabout multiple film strip segments of the closed loop are transitorily stored in a slidable adjacent face-to-face contact. The system includes a deck, film guide means, film drive means, and a film oscillator subassembly which jogs laterally the film strip segments in the sub-pathway. The oscillator subassembly functions to prevent film seizures in the sub-pathway which tend to occur more frequently as the total film loop perimeter is increased for a substantially constant sub-pathway perimeter.

8 Claims, 13 Drawing Figures

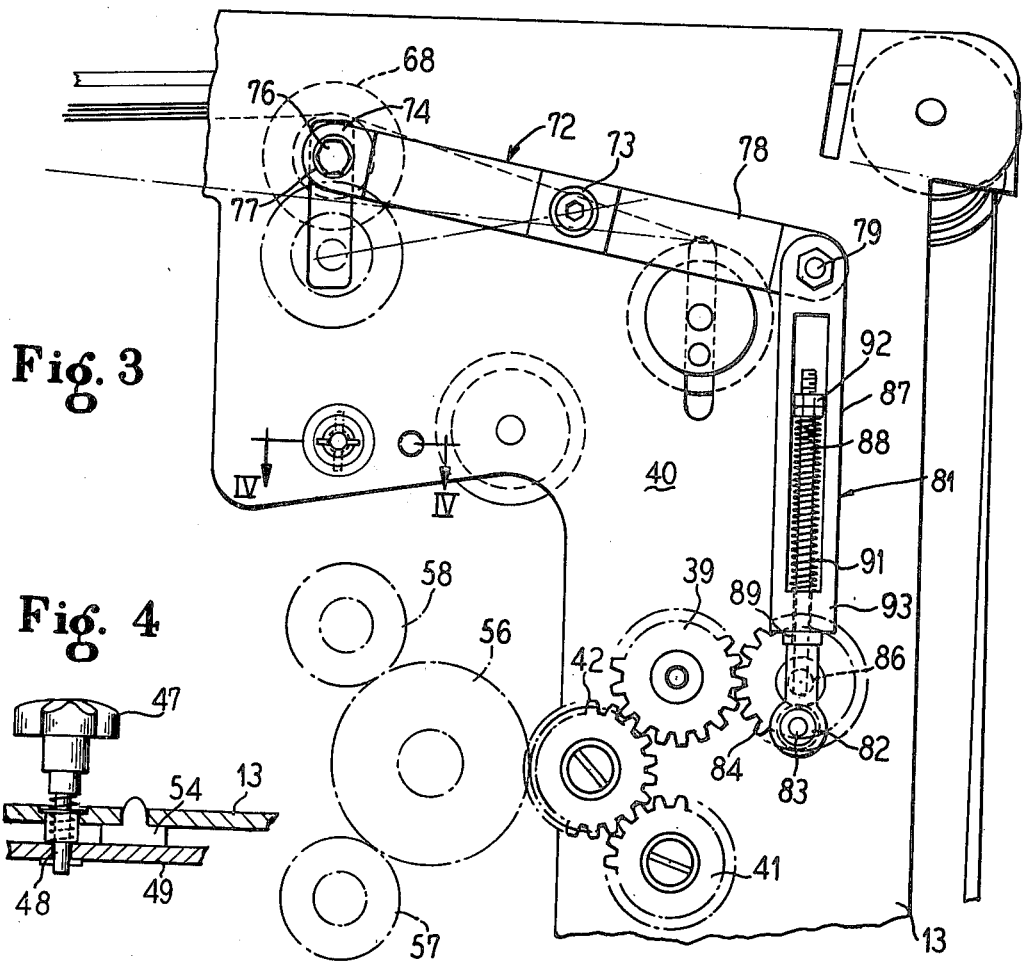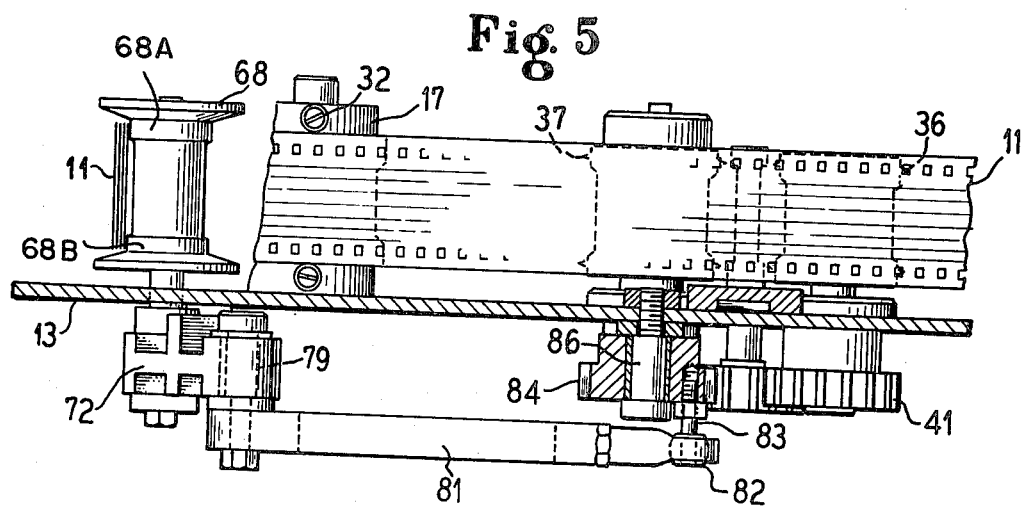

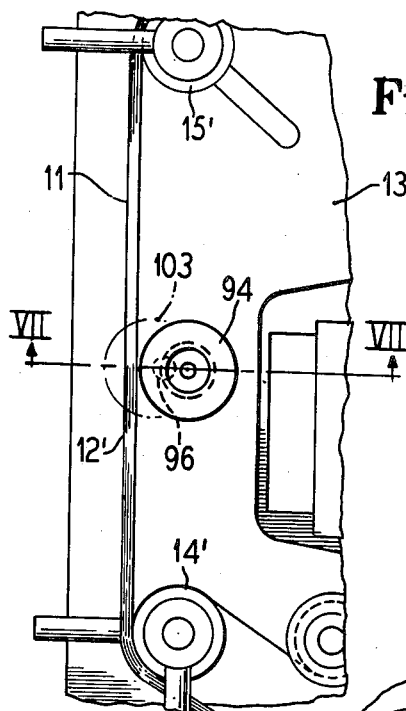
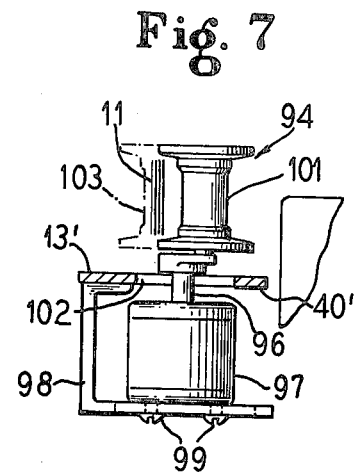
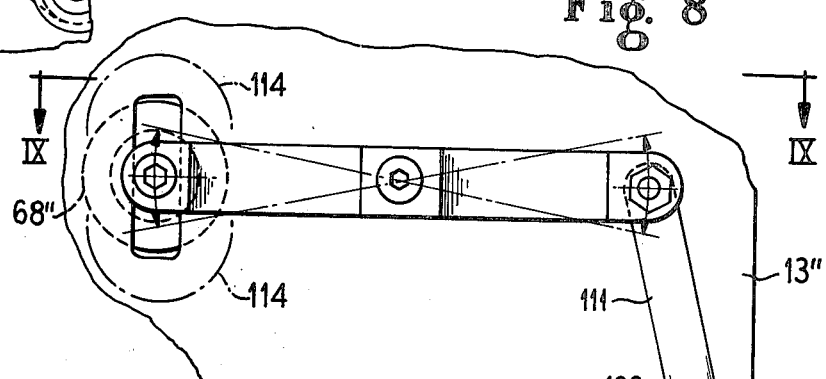
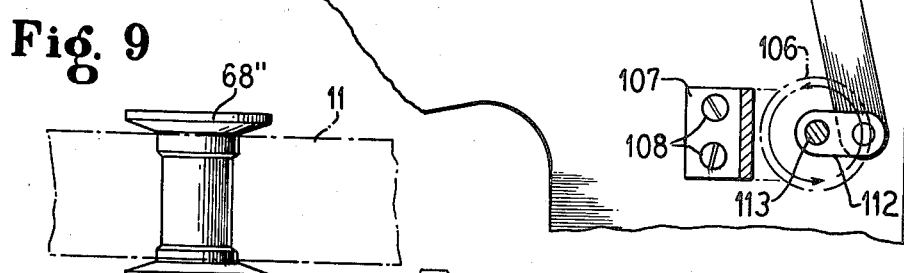
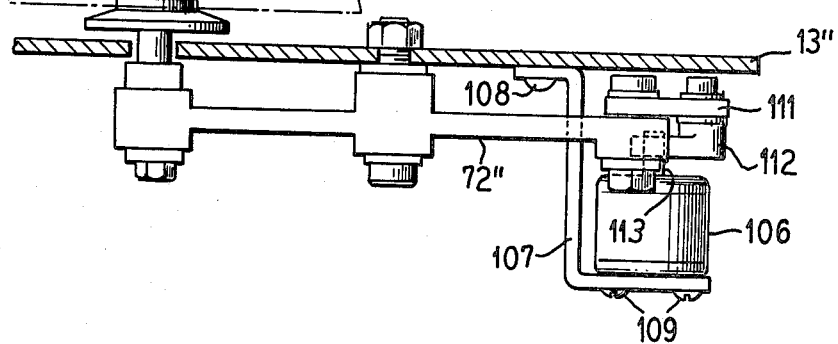

NON-SEIZING CLOSED LOOP FILM TRANSPORT SYSTEM

RELATED APPLICATION

This application is a continuation-in-part of my earlier filed U.S. application Ser. No. 817,565, filed July 21, 1977, now abandoned.

BACKGROUND OF THE INVENTION

In the art of closed loop film or tape information storage and retrieval systems, such as a photo-optically controlled pattern generator, or the like, a relatively large number of turns or strata of film strip segments or layers may overlie one another in the sub-pathway along the pathway chosen for closed loop film storage and transport. In a closed loop film transport system, the individual film layers in the sub-pathway are typically generally continuously being translated. Thus, the translation travel rate of each film layer in the sub-pathway is slightly different from that of adjacent such film layers with sub-pathway tape segment speeds varying progressively as one proceeds from outward segments inwardly.

In, for instance, a photo-optical closed loop system of the type employing edge perforated film (for example, of the conventional 35 mm type), a single drive capstan unit can be used to move the closed film loop even when the number of individual film layers is relatively large; for example, in excess of 50. However, with increasing numbers of film layers in the sub-pathway, there is a definite tendency for adjacent film layers to seize and bind against one another so that film transport cannot be effectuated by the capstan drive thus resulting in an equipment operational failure. The exact conditions causing such a film seizure are somewhat variable, apparently, being dependent upon many factors including, for examples, film surface characteristics, film transport speeds, amount of air present between adjacent layers, environmental temperature and humidity conditions, and the like. The manner, and especially the direction, of film travel relative to the sub-pathway in the system affects whether or not film seizures will occur. When, for example, the number of sub-pathway adjacent film layers falls above about 50, film seizures can apparently readily occur, which creates severe operating problems, especially with automated equipment.

Previous efforts to alleviate this problem have involved hand manipulation of film layers to keep same in a "free" condition which is considered an undesirable solution because of safety considerations and because of the need to minimize continuous operator attention during machine operation. No mechanical or pneumatic contrivances are known which will automatically eliminate film seizure when a film strip is moved from the inside to the outside of a sub-pathway, such as the pathway used in the memory center of a pattern reader and controller for a circular knitting machine, and where the film loop perimeter is very large compared to that of the sub-pathway.

BRIEF SUMMARY OF THE INVENTION

The present invention provides in a closed loop film transport system integrally incorporated means for automatically and continuously oscillating to a desired extent the film strip segments occuring in a convolutely would sub-pathway used for storing multiple film strip segments of the film's closed loop so as to prevent film seizing from occurring during transport system operation even when very large film lengths are employed relative to the size of the sub-pathway. The film transport system is of the type wherein the film is withdrawn from the inside convolution of such sub-pathway, passed through a pattern reader, passed over or under said sub-pathway, and then returned to said sub-pathway to form the outside convolution of said sub-pathway.

An object of this invention is to overcome the above indicated prior art problems of film seizures in closed loop film transport systems wherein film is moved from the inside to the outside of a convolutely wound sub-pathway.

Another object is to provide a means which can be integrally incorporated into such a closed loop film transport system and which will prevent film seizures.

Another object is to provide a means of the class indicated which will function automatically and continuously during operation of such a transport system.

Another object is to provide an oscillator subassembly apparatus which is incorporatable into such a closed loop tape transport system.

Another object is to provide process for continuously and automatically jogging film in such a closed loop film transport system.

Another object is to provide a simple, reliable, economical and practical system for preventing film seizures in a closed loop film transport system.

Other and further objects, purposes, advantages, aims, utilities, features and the like will be apparent to those skilled in the art from a reading of the present specification taken together with the drawings.

BRIEF DESCRIPTION OF THE DRAWINGS

In the drawings:

FIG. 3 is an enlarged fragmentary bottom plan view taken in the region III—III of FIG. 2;

FIG. 4 is an enlarged, fragmentary vertical sectional view taken through the region IV—IV of FIG. 3;

FIG. 5 is an enlarged, fragmentary vertical sectional view taken along the line V—V of FIG. 2;

FIG. 6 is a fragmentary view in top plan of the left hand portion of a film transport system incorporating another oscillator subassembly of this invention;

FIG. 7 is a vertical sectional view taken along the line VII—VII of FIG. 6;

FIG. 8 is a view similar to FIG. 3 but showing a further embodiment of an oscillator subassembly of the present invention;

FIG. 9 is a vertical sectional view taken along the line IX—IX of FIG. 8;

DETAILED DESCRIPTION

Figure 1:
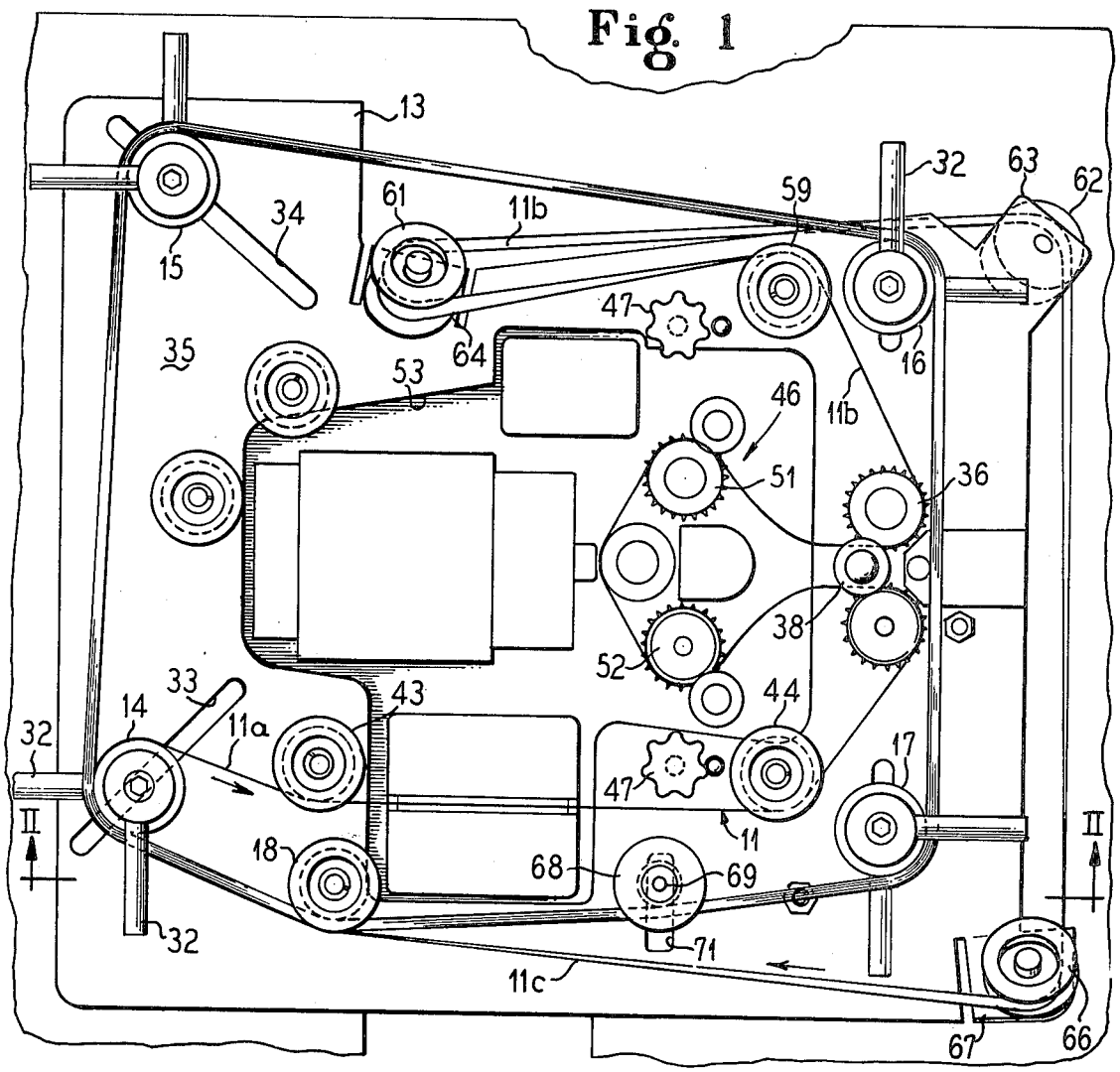
FIG. 1 is a top plan view of a film transport system incorporating an oscillator subassembly of the present invention, some parts thereof broken away and some parts shown in section.

Referring to the drawings there is seen in FIG. 1 an embodiment of apparatus for handling flexible members and more particularly apparatus for facilitating the movement of an elongated film 11 in the form of a closed loop about a defined pathway. The term "film" is used herein in a generic sense to include both film and tape members, such as photographic film and magnetic tape, as those skilled in the art will readily appreciate. The pathway includes a sub-pathway herein generally designated in its entirety by the numeral 12 whose general perimeter is substantially less than the perimeter of the closed loop of film 11. The sub-pathway 12 has multiple strip segments of film 11 wound or festooned thereabout with the individual strip segments being in a slidable adjacent, face-to-face contact with one another.

Figure 2:
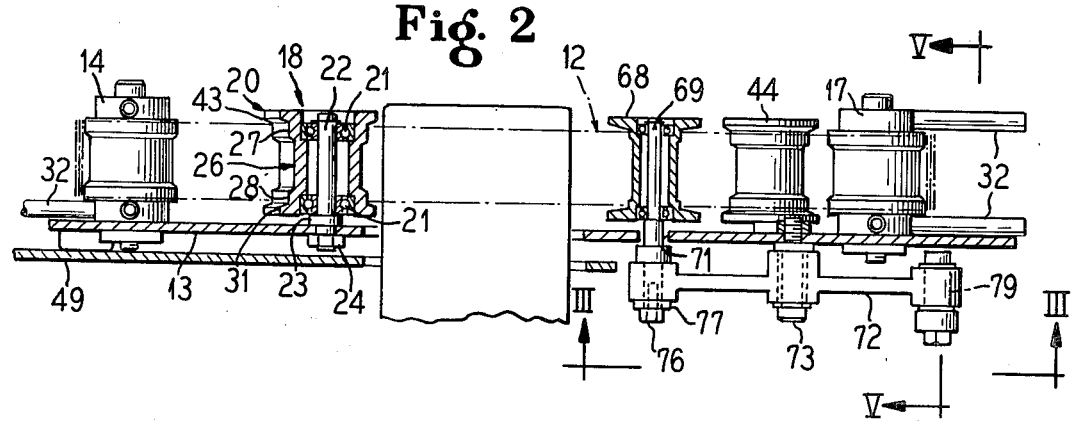
FIG. 2 is a vertical sectional view taken along the line II—II of FIG. 1, some parts thereof broken away.

The apparatus includes a deck member here in the form of a flattened plate 13, film guide means, and film drive means. The film guide means employs a plurality of spools all of which are functionally associated with the deck member plates 13. In apparatus shown, the spools 14, 15, 16, 17 and 18 define the film sub-pathway 12. Each of the spools 14 through 18 can be regarded as being somewhat similar to the others in structure. Thus, representative spool 18 (referring to FIG. 2) is seen to employ a reel 20 which is journalled for rotational movements on bearings 21 (paired), the bearings 21 in turn being mounted on shaft 22. The base of shaft 22 extends through the plate 13 and is mounted in a fixed relationship thereto between a collar 23 and a nut 24 threadably received on the terminal end of the shaft 22. In order to avoid contact with the side face of film 11 the mid circumferential regions 26 of reel 20 are recessed relative to the opposed side edge regions 27 and 28 thereof. For film guide purposes, the reel 20 is provided with a pair of radially upstanding shoulders 29 and 31 along opposed side edge regions thereof. Such shoulders are eliminated from the spools 14, 15, 16 and 17 and, alternatively, each of these spools is provided with a series of radially outwardly projecting guide rods 32, each individual guide rod 32 being individually spaced from the other thereof on each spool 14, 15, 16 and 17 by about 90° with one such guide rod being located on one side of each such spool 14 through 17 and with the other such guide rod 32 being located at the opposed side of each such respective spool. The circumferential surface of each guide rod is in the nature of a sleeve (not detailed) which is internally journalled for rotational movements to aid in guiding film about sub-pathway 12. The guide rods 32 are employed so as to permit the sub-pathway 12 to accommodate a relatively large number of film strip segments in sub-pathway 12, as those skilled in the art will appreciate. Diagonally extending slots 33 and 34 formed in the plate 12 provide adjustability for the respective spools 14 and 15 with consequent variations in the exact path of sub-pathway 12.

The film 11 is here edge perforated, such as a 35 mm imaged and developed photographic type film. The film is imaged with a plurality of pattern tracks which here generally longitudinally extend on the film 11. For example, the film can have 24 such tracks together with a 25th track used for synchronization purposes. Such a film and such an apparatus for film transport is useful in a photo-optically controlled pattern generator such as is employed, for example, in the automatic operation of a multi-feed silver high pile fabric circular knitting machine.

In the apparatus shown, the film drive means is provided by drive sprockets 36 and 37 which upstand from the front face 35 of plate 13. The sprockets 36 and 37 are in a closely spaced relationship to one another with a pressure roller 38 associated therewith which likewise upstands functionally from plate 13. The drive shaft of each sprocket 36, 37 extends through plate 13 and has keyed thereto a drive gear 39, 41 respectively on rear face 40 of plate 13. Gears 39 and 41 are driven by a single common drive gear 42 engaged therewith.

Drive sprocket 37 engages and pulls drivably the innermost film strip segment 11a from sub-pathway 12. Thus, the innermost film strip segment 11a is extended around spool 14 past the guide spools 43 and 44 into engagement with the drive sprocket 37. Each guide spool 43 and 44 can be similar to the spool 18 in construction. Sprockets 36 and 37 rotate at uniform velocity. After being discharged from sprocket 37 and before being taken up by sprocket 36 a segment of film 11 travels through a photo-optical pattern generator apparatus which is herein designated in its entirety by the numeral 46. Apparatus 46 can be of known construction and does not form a part of the present invention. Apparatus 46 continuously takes information from film 11 and photo-optically converts same into signals used to control apparatus as desired, such as a circular knitting machine. To accommodate apparatus 46 an appropriately sized aperture 53 is centrally formed in plate 13 so that the plate 13 and elements associated therewith can be spatially positioned peripherally about the apparatus 46 with the spatial orientation of sub-pathway 12 and sprockets 36 and 37 and their associated components being such that the sprockets 36 and 37 are generally aligned with drive sprockets 51 and 52 and other associated components forming an integral part of the apparatus 46, as those skilled in the art will appreciate. Quick connect/disconnect means are provided for mounting the plate 13 in a fixed relationship to the apparatus 46, such means here being provided by a pair of spring loaded knob actuated locking pin assemblies 47 (see FIG. 4) which are permanently functionally associated with deck member plate 13 and which align with locating apertures 48 (paired) in a base plate 49 which mounts and supports the apparatus 46 and sub-components thereof. Spacing between plate 13 and plate 49 is controlled by shim spacers 54. A single power head, such as an electric motor (not detailed) can be used to drive a main gear 56 whose diameter is such as to permit same to engage and drive not only gear 42 but also gears 57 and 58, respectively, which are associated with the sprockets 51 and 52. Thus, uniform speed of film 11 is assured.

The film strip segment 11b discharged from sprocket 36 is guided past a guide spool 59, which can be similar to spool 18 in construction, and then about a guide spool 61. The guide spool 61 is adapted to turn film strip segment 11b through an angle of about 180° respectively. In addition, the guide spool 61 is mounted on a portion of the deck member plate 13 which is angularly inclined relative to the front face 35 thereof so that guide spool 61 is inclined angularly with respect to, for example, the guide spool 59. The inclination angle of guide spool 61 is sufficient to pass the film strip segment 11b turned thereover sideways past sub-pathway 12 into an aligned relationship with another guide spool 62. The guide spool 62 like guide spool 61 has an inclined axis achieved by mounting the guide spool 62 on a tab 63 projecting from plate 13 angularly so as to approximately match the angle associated with the tab 64 on which the guide spool 61 is mounted. Thus, guide spool 62 is so located as to receive a film segment from guide spool 59. Also, guide spool 62 is so located as to discharge a film strip segment therefrom towards an aligned guide spool 66. Guide spool 66 upstands from a tab 67 angularly adjacent the front face 35 of plate 13, the tab 67 being integral with the plate 13. The guide spool 66 is located not only to receive a film strip segment from the guide spool 62 but also to discharge same into and thereby form the outermost film segment of the sub-pathway 12 with the film strip segment 11c discharged from guide spool 66 passing over the spool 18 as it enters and becomes a part of the sub-pathway 12. The spool 61, 62 and 66 thus permit film cross-over from sub-pathway 12 and return thereto on an opposite side thereof so as to maintain integrity of the closed loop of film 11, as desired. Any convenient combination of guide means can be used to achieve such a film cross-over and return in a closed loop system, as those skilled in the art will appreciate. Construction of the guide spools 59, 61 and 66 can be similar to that employed for the spool 18.

The film transport system shown in FIGS. 1 through 5 is further provided with a spool which is journalled for rotational movements and which upstands from front face 35 of deck member plate 13, the construction of spool 68 can optionally be similar to that employed for the spool 18. The guide spool 68 is thus adapted to contact a side portion of film 11 in sub-pathway 12 at a location somewhere in the mid region between an adjacent pair of spools, here 17 and 18, along the sub-pathway 12. The non-rotating shaft 69 of guide spool 68 extends through a channel 71 formed in plate 13. The location and shape of the channel 71 such as to make the channel 71 extend approximately normally to film strip segments in sub-pathway 12 in the region of the guide spool 68. It is preferred to have the guide spool 68 deflect generally perpendicularly into the sub-pathway 12 but any convenient arrangement for producing a lateral or sidewise deflection of film strip segments in sub-pathway 12 can be employed in accordance with this invention.

In the embodiment shown, such a thrust means includes the lever 72 which is journalled at a mid axis for oscillatory pivotal movements about a pivot shaft 73. One end 74 of lever 72 makes a journalled engatement with the terminal end portion of the shaft 69, the shaft 69 being here conveniently engaged non-rotatably with the lever 72 by means of a hex-headed cap screw 76 and a washer 77. The opposite end 78 of lever 72 is oscillatorily interconnected by a shaft 79 to one end of a throw arm assembly 81. The opposite end of throw arm assembly 81 terminates in a universal bearing 82. In turn, universal bearing 82 connects with a crank shaft 83. Crank shaft 83 projects sidewards in eccentric relationship to the keyed drive shaft 86 of gear 84, the drive shaft 86 being mounted to plate 13 and the gear 84 making meshing engagement with the gear 39 so as to be drivable thereby. The degree of eccentricity of crank shaft 83 is chosen so as to produce a desired amount of throw in end 74 of lever 72 reciprocatorily as the gear 84 revolves. The rotational speed of crank shaft 83 regulates the frequency of oscillatory movements of shaft 69. Since gear 84 is driven through a connecting gear train (not shown) by gear 56, only a single powerhead is needed both for translating film 11 and for reciprocatorily deflecting guide spool 68.

Since it is conceivable that emergency operating conditions could exist under which oscillatory movements of end 74 of lever 72 should not occur (as when side-wise deflection of film segments in sub-pathway 12 would effect a possibility of film damage) an overload release mechanism is provided in the throw arm assembly 81. Thus, the throw arm assembly 81 incorporates a guide clevis 87 one end of which is journalled to shaft 79 as described. The other end of clevis 87 receives thereinto longitudinally a slide bar 88. The maximum distance which slide bar 88 can extend into guide clevis 87 longitudinally is limited by stop nut 89 which is threadably received on bar 88 and which abuts against an end of clevis 87 when the bar 88 is fully engaged therewith. A compression coil spring 91 is circumferentially mounted about the shank of bar 88 within clevis 87 and spring 91 is retained on bar 88 by means of a pair of set nuts 92 threadably received over the interior (relative to clevis 87) end of bar 88. The exterior end of bar 88 terminates in the universal bearing 82 above referenced. The tension of spring 91 can thus be adjusted to a predetermined extent so that whenever resistance to sidewards movement of guide spool 68 across sub-pathway 12 reaches some predetermined level, the clevis 87 slidably moves along the shank of bar 88 in clevis region 93 with the result that oscillatory movement of the spool 68 do not then occur, as desired.

As a further emergency drive release capability, gear 39 can have a slip clutch assembly (not shown) associated therewith.

While the embodiment shown in FIGS. 1 through 5 incorporates one presently preferred oscillator subassembly for reciprocatory film deflection in accordance with the teachings of the present invention other arrangements within the meaning and spirit of the present invention are possible. For one thing, such an oscillator subassembly can be located at any convenient location along sub-pathway 12 between adjacent spool pairs therealong so long as such assembly makes contact with the inside loop of the convolutely named sub-pathway. For another thing, any convenient combination of thrust means and power head means may be employed as can variations in film engaging means. In one preferred form, the oscillator subassembly has a film engaging means which is located along the film sub-pathway where the sprocket drive means engages and pulls the innermost film strip segment with a guide spool means therebetween. In another preferred form, the oscillator subassembly has a film engaging means which is located about midway between a pair of longitudinally, (relative to said film sub-pathway) spaced guide spool means, in which event the spacing between members of such pair is preferably at least about 5 times the film width.

Referring to FIGS. 6 and 7, there is seen an alternative embodiment of an oscillator subassembly adapted for use with a film transport system such as shown in the embodiment of FIGS. 1 through 5. Here, a spool 94 has an eccentric drive shaft 96 fixed to the base thereof. Shaft 96, in turn, is directly driven by powerhead 97. Powerhead 97 is conveniently suspended from the rear face 40' of plate 13' by a bracket 98 which can be secured by welding or the like to plate 13' and to which powerhead 97 may be secured by holding screws 99 or the like. A sleeve 101 is revolvably associated with circumferential portions of spool 94 permitting the sleeve 101 to make rolling engagement with portions of film 11 contacted therewith.

An appropriate aperture 102 is formed in plate 13' to accommodate shaft 96. The position of spool 94 relative to deck 13' is illustrated in FIG. 6 and the extent of movement of spool 94 across film sub-pathway 12' is illustrated by the dotted line 103 in FIG. 6.

In FIGS. 6 and 7, components similar to the components of the embodiment of FIGS. 1 through 5 are similarly numbered but with the addition of prime marks thereto. In FIGS. 8 and 9 still another embodiment of the present invention is shown. Here, components similar to those employed in the embodiment of FIGS. 1 through 5 are similarly numbered but with the addition of double prime marks thereto. The mechanism of FIGS. 8 and 9 is similar to that shown in the embodiment of FIGS. 1 through 5 except that here the spool 68" is reciprocatorily deflected using an independent powerhead 106. Powerheads 97 and 106 can be electric, fluid, magnetic, or the like, as those skilled in the art can appreciate.

Powerhead 106 is suspended from deck 13", bracket 107 being secured to deck 13" by screws 108, and powerhead 106 being secured to bracket 107 by screws 109. Lever 72" is oscillatorily driven by the solid throw arm 111 reciprocatorily connected thereto at one end thereof with the other end thereof being reciprocatorily connected to the terminal end of a crank arm 112. The opposite end of crank arm 112 is keyed to the drive shaft 113 of powerhead 106. The extent of throw or oscillation associated with guide spool 68" is shown by the dotted lines 114 in FIG. 8.

As shown in the preceding embodiments, it is generally preferred for purposes of the invention if the contact location of the film engaging means extends only about 8% of the distance transversely across the film at the contact location; see, for example, spool 68 in FIG. 5 where the shoulders 68A and 68B together extend only about 8% of the distance transversely across the film 11 at the contact location. Preferably also, such engaging means has a longitudinally (relative to the direction of film travel) continuously convexly curved surface at the location of contact of engaging means with film side, and, preferably also, the longitudinal contact distance of the film against the engaging means is less than about 50% of the transverse width of the film during a deflecting cycle; see, for example, spool 68 in FIG. 1 with the film 11 in contact therewith. Most preferably, the engaging means is cross sectionally circular at locations where the engaging means contacts side portions of film segments. Also, surface portions of the engaging means are preferably journalled for rotational movements thereof as the film passes thereover to minimize surface scratching of the film even in edge regions thereof.

Figure 13:
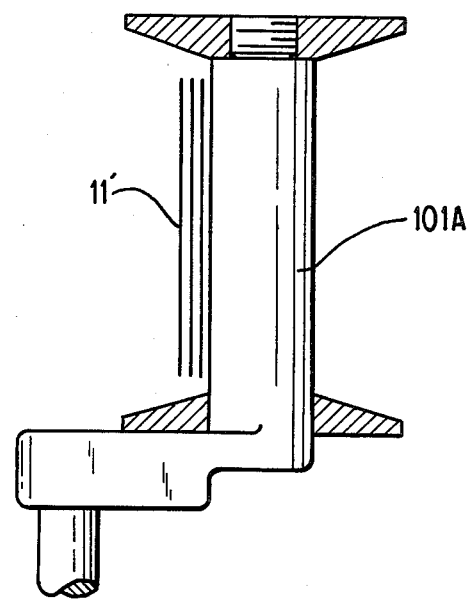
FIG. 13 is a vertical sectional view similar to FIG. 7 but showing a further embodiment of an oscillator sub-assembly of the present invention.

In place of the spool arrangement illustrated in FIGS. 6 and 7 one can simply employ an upstanding pin means on a crank arm which is eccentrically driven by powerhead 97 (see FIG. 13). Such a pin as shown in FIG. 13 can have a round shank 101A adapted to have circumferential side portions thereof engage side surface portions of a film segment 11'.

Based upon present experience involving practice of the present invention, a sidewise film deflection along sub-pathway 12 in the range of from about 0.05 to 1 times the width of the film 11 is desirable where the film width ranges from about 4 to 64 millimeters. Similarly in conjunction with such deflections a frequency of reciprocation in the range from about 0.2 to 6 cycles per second is desirable for film longitudinal travel speeds ranging from about 100 to 2000 centimeters per minute. This makes it both practical and desirable to power the deflection means from an eccentric located on the film transport deive means based on the observation that higher frequencies are effective with lower amplitudes. It is believed that the deflection means could be powered by a separate high frequency, low amplitude source such as shown in FIGS. 7 through 9 or alternatively by an acoustical vibrator. The apparatus of the present invention is particularly desirable for use with 35 mm edge perforated film.

For purposes of the present invention, sidewise deflection of a film is measured as the extent of lateral film movement relative to the longitudinal path of the film in a sub-pathway 12. The present invention is particularly well suited for use in those situations where the number of multiple strip segments in a closed loop positioned in a slidable adjacent face-to-face contact with one another exceeds about fifty, and has been successfully evaluated, for example, when such segment number is greater than about 250.

Figure 10:
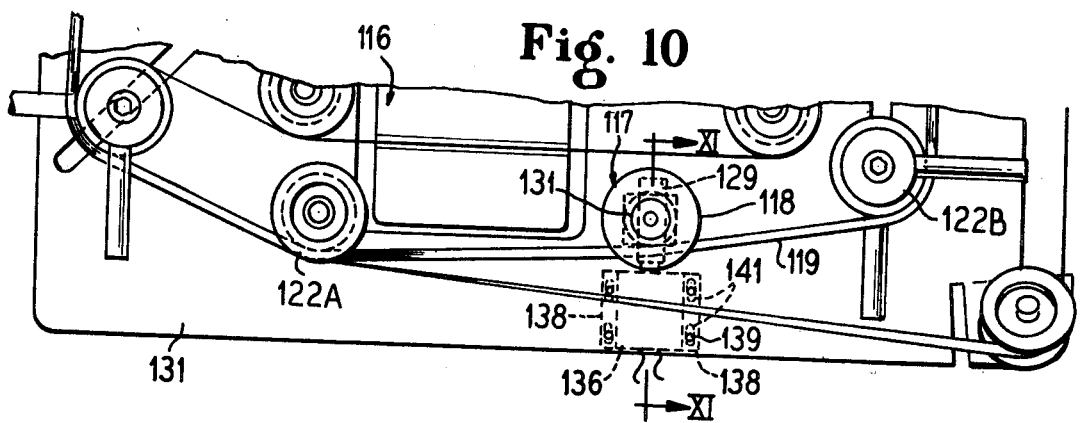
FIG. 10 is a fragmentary top plan view of a film transport system similar to that shown in FIG. 1 but showing another embodiment of an oscillator subassembly useful in the practice of the present invention.
Figure 11:
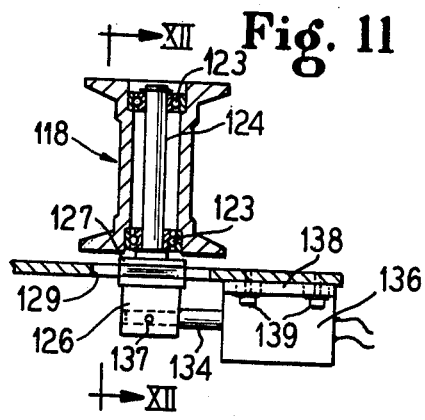
FIG. 11 is a vertical sectional view taken along the line XI—XI of FIG. 10.
Figure 12:
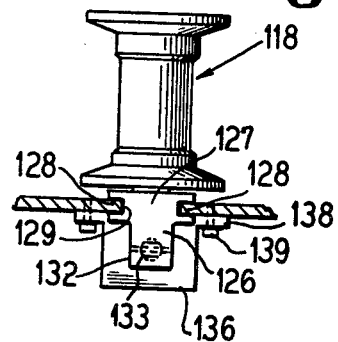
FIG. 12 is a side elevational view taken along the line XII—XII of FIG. 11.

Referring to FIGS. 10 through 12 there is seen a film transport system of this invention herein designated in its entirety by the numeral 116. The construction and operation of this transport system 116 is similar to that described above in reference to FIG. 1. The transport system 116 is provided with an oscillator subassembly which is herein designated in its entirety by the numeral 117. This oscillator subassembly utilizes a guide spool 118 which is adapted to contact a side portion of a film 119 in sub-pathway 121, the guide spool 118 being located nominally in a mid region between an adjacent pair of spools, here spools 122A and 122B along the sub-pathway 119. Spool 118 is journalled for axial rotational movements by bearings 123 which are mounted on a shaft 124. The bottom of the shaft 124 is associated with a guide member 126 which in transverse cross section resembles a T in shape. The cross member 127 of guide member 126 is provided with grooves 128 (paired at the opposed end portions thereof). These grooves 128 adapt guide member 126 for receipt in a slot 129 formed in deck 131 of transport system 116. The guide member 126 is conveniently formed of a molded plastic (such as nylon, polythetrafluoroethylene, or the like) and is preferably formulated so as to be self lubricating. Alternatively, the guide member 126 can be comprised of a metal such as brass or the like.

The base portion 132 of a guide member 126 has an aperture 133 extending therethrough into which extends the shaft 134 of a conventional oscillator 136. Shaft 134 is conveniently pinned against rotation to the base portion 132 by means of a pin 137 or the like.

Oscillator 136 is provided with a pair of flanges 138 extending outwardly along the upper side edge portions thereof in opposed relationship to one another. To secure oscillator 136 to the underside of deck 131, four holes are tapped in deck 131 so as to threadably receive thereinto individual ones of machine bolts 139. These bolts 139 extend through slots 141 formed in flanges 138 (two slots 141 being in each flange 138), the slots 141 providing adjustability for positioning the assembly of oscillator 136, guide member 126 and spool 118 for optimum effect in relation to sub-pathway 121, the bolts 139 being tightenable so as to fix adjustably the location of oscillator 136 to deck 131. The arrangement shown permits controlled vibration of guide spool 118 without resting a downwardly urging load on oscillator 136 and shaft 134. Also, the arrangement shown produces primary oscillations in a direction transversely to the subpathway 121 which is preferred in the practice of the present invention.

A wide range of oscillation frequencies may be employed in the utilization of an oscillator 136, one convenient range extending from about 10 to 400 cycles per second. Similarly, the amplitude associated with such a vibrational frequency can vary widely. A typical amplitude range for use with an oscillator 136 falls in the range of from about 0.005 to 0.060 inches. Oscillator 136 can be fluid, electric, magnetic, or the like, as those skilled in the art can appreciate.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth in the hereto-appended claims.

I claim as my invention:

1. In a film transport system of the type adapted to trasnsport a closed loop of film continuously about a defined pathway, said pathway including a convolutely wound subpathway whose general perimeter is substantially less than the perimeter of said closed loop, and whereabout multiple strip segments of said closed loop are positioned in a slidable, adjacent, face-to-face contact with one another, said transport system including a deck member, on plurality of film guide means positioned said pathway, and film drive means, said film guide means being associated with said deck member and being arranged to define said pathway, including said subpathway, and also including a cross-over pathway extending from the inside convolution of said subpathway, over one edge of said subpathway, and to the outside convolution of said subpathway in which the film travels in a direction from the inside convolution of said subpathway over one edge of said subpathway and to the outside convolution of said subpathway, the improvement which comprises:
(A) engaging means for contacting an inside portion of said wound subpathway film, said engaging means being spatially positioned at a location adjacent said film subpathway between two longitudinally adjacent film guide means,
(B) thrust means functionally associated with said engaging means for reciprocatorily deflecting sidewards said engaging means into said film subpathway, and
(C) a powerhead functionally associated with said thrust means for so deflecting said thrust means.

2. The transport system of claim 1 wherein said thrust means comprises a wheel member means having an eccentric drive shaft means associated therewith.

3. The transport system of claim 1 wherein said engaging means comprises a pin means upstanding from a crank member, said pin means having a round shank adapted to engage a side of said film.

4. The transport system of claim 2 wherein circumferential portions of said wheel member comprise said engaging means.

5. The transport system of claim 1 wherein said thrust means includes an elongated rocker arm means pivotable about an axis centrally thereof, one end of said rocker arm means being associated with said engaging means, the opposed end of said rocker arm being pivotally associated with one end of a lever arm, the opposite end of said lever arm being journalled to the side of a driven wheel means.

6. A process for eliminating film seizure in a film transport system of the type adapted to transport a closed loop of film continuously about a defined pathway, said pathway including a convolutely wound subpathway whose general perimeter is substantially less than the perimeter of said closed loop and whereabout multiple strip segments of such closed loop are positioned in a slidable, adjacent, face-to-face contact with one another, the film loop extending from an inside convolution of said subpathway over one edge of said subpathway and back to the outside of said subpathway to form the outside convolution thereof, in which the film travels in a direction from the inside convolution of said subpathway over one edge of said subpathway and to the outside convolution of said subpathway, said process comprising the steps of:
(A) positioning a film engaging means along said subpathway at an inside location between two successive film guide means for such subpathway, and
(B) reciprocatorily deflecting sidewards such film engaging means into said film subpathway.

7. The process of claim 6 wherein the frequence of reciprocation ranges from about 0.2 to 6 cycles per second for film longitudinal travel speeds ranging from about 100 to 2000 centimeters per minute.

8. The transport system of claim 1 wherein said thrust means includes a lever arm one end of which is functionally interconnected with said engaging means and the other end of which is functionally interconnected with said powerhead for reciprocal driving movements.

* * * * *